US010458282B2

(12) United States Patent
Reinhardt et al.

(10) Patent No.: US 10,458,282 B2
(45) Date of Patent: *Oct. 29, 2019

(54) GAS TURBINE ENGINE MODULE ADAPTER TO A CARRIER

(71) Applicant: Pratt & Whitney Canada Corp., Longueuil (CA)

(72) Inventors: Gregory Reinhardt, South Glastonbury, CT (US); Joseph Swiderski, Dundas (CA); Douglas Pollock, Brossard (CA); Real Barrette, Ste-Julie (CA); Stephane Mongeau, Mascouche (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 332 days.

This patent is subject to a terminal disclaimer.

(21) Appl. No.: 15/404,601

(22) Filed: Jan. 12, 2017

(65) Prior Publication Data

US 2017/0145862 A1 May 25, 2017

Related U.S. Application Data

(60) Continuation of application No. 14/962,320, filed on Dec. 8, 2015, now Pat. No. 9,982,568, which is a
(Continued)

(51) Int. Cl.
*F01D 25/28* (2006.01)
*F01D 25/24* (2006.01)
*B66C 11/04* (2006.01)

(52) U.S. Cl.
CPC .......... *F01D 25/285* (2013.01); *F01D 25/24* (2013.01); *B66C 11/04* (2013.01); *F01D 25/28* (2013.01);
(Continued)

(58) Field of Classification Search
CPC .. F01D 25/28; F01D 25/285; Y10T 29/49826; Y10T 29/49234; Y10T 29/49895
See application file for complete search history.

(56) References Cited

U.S. PATENT DOCUMENTS 2,825,477 A 3/1958 Ross
2,928,535 A 3/1960 Simmons et al.
(Continued)

FOREIGN PATENT DOCUMENTS

EP 777572 B1 10/2000
EP 2587003 5/2013
(Continued)

OTHER PUBLICATIONS

European Search Report, EP16159390, dated Jul. 20, 2016.
(Continued)

*Primary Examiner* — Tyrone V Hall, Jr.
(74) *Attorney, Agent, or Firm* — Norton Rose Fulbright Canada L.L.P.

(57) ABSTRACT

An engine mounting arrangement is provided for supporting a gas turbine engine. The mounting arrangement comprises a module adaptor mounted to an overhead or a ground based carrier for rotation about a substantially horizontal axis. The module adaptor extends horizontally from a base to an axially-opposed distal end having a first mounting interface configured for attachment to a module of the engine. The module adaptor holds the engine by the module to which it is attached and with the other engine modules projecting in a cantilever fashion from the supported module.

59 Claims, 5 Drawing Sheets

Related U.S. Application Data division of application No. 13/099,681, filed on May 3, 2011, now Pat. No. 9,228,451.

(52) U.S. Cl.
CPC ...... *F05D 2220/30* (2013.01); *F05D 2220/32* (2013.01); *F05D 2220/36* (2013.01); *F05D 2230/60* (2013.01); *F05D 2230/68* (2013.01); *F05D 2230/72* (2013.01); *F05D 2240/91* (2013.01); *Y02T 50/671* (2013.01); *Y10T 29/49229* (2015.01); *Y10T 29/49826* (2015.01)

(56) References Cited

U.S. PATENT DOCUMENTS

| | | | |
|---|---|---|---|
| 2,930,492 A | 3/1960 | Metcalf | |
| 2,936,907 A | 5/1960 | Woodruff | |
| 3,194,525 A | 7/1965 | Webb | |
| 3,208,217 A | 9/1965 | Sonder | |
| 3,268,093 A | 8/1966 | Keiter | |
| 3,556,672 A | 1/1971 | Gentile | |
| 3,738,105 A | 6/1973 | Buchelt | |
| 3,841,495 A | 10/1974 | Dronick et al. | |
| 3,960,418 A | 6/1976 | Bracken | |
| 4,044,442 A * | 8/1977 | Carlson | F01D 25/285 |
| | | | 29/428 |
| 4,200,273 A | 4/1980 | Das Gupta et al. | |
| 4,239,196 A | 12/1980 | Hanger | |
| 4,395,180 A | 7/1983 | Magnotte | |
| 4,645,083 A | 2/1987 | Vinciguerra | |
| 4,660,796 A | 4/1987 | Garrec | |
| 4,748,517 A | 5/1988 | Shibata et al. | |
| 4,767,267 A | 8/1988 | Salt et al. | |
| 5,119,732 A | 6/1992 | Lisy | |
| 5,170,662 A | 12/1992 | Brault et al. | |
| 5,293,775 A | 3/1994 | Clark et al. | |
| 5,321,874 A | 6/1994 | Mills et al. | |
| 5,363,770 A | 11/1994 | Makimura et al. | |
| 5,383,652 A * | 1/1995 | Van Den Berg | B25H 1/0007 |
| | | | 269/17 |
| 5,396,791 A | 3/1995 | Mollmann et al. | |
| 5,396,793 A | 3/1995 | Colletti | |
| 5,575,607 A | 11/1996 | Grout et al. | |
| 5,645,389 A | 7/1997 | Lilja et al. | |
| 5,646,388 A | 7/1997 | D'Entremont et al. | |
| 5,653,351 A | 8/1997 | Grout et al. | |
| 5,722,512 A | 3/1998 | Lilja et al. | |
| 5,816,367 A | 10/1998 | Lilja et al. | |
| 5,819,906 A | 10/1998 | Enderlein et al. | |
| 5,860,275 A | 1/1999 | Newton et al. | |
| 5,870,824 A | 2/1999 | Lilja et al. | |
| 5,911,680 A | 6/1999 | Takeoka | |
| 6,000,903 A | 12/1999 | Hatch et al. | |
| 6,170,141 B1 | 1/2001 | Rossway et al. | |
| 6,279,309 B1 * | 8/2001 | Lawlor | F01D 25/285 |
| | | | 60/39.35 |
| 6,292,999 B1 | 9/2001 | Rossway et al. | |
| 6,298,536 B1 | 10/2001 | Rossway et al. | |
| 6,332,604 B1 | 12/2001 | Chu | |
| 6,546,616 B2 | 4/2003 | Radowick | |
| 6,619,640 B1 | 9/2003 | Ploski | |
| 6,664,499 B1 | 12/2003 | Brink et al. | |
| 6,802,493 B2 | 10/2004 | Lance | |
| 6,851,303 B2 | 2/2005 | Parfitt et al. | |
| 6,860,800 B1 | 3/2005 | Maurer | |
| 7,047,614 B2 | 5/2006 | Scott et al. | |
| 7,103,952 B2 | 9/2006 | Appleton et al. | |
| 7,128,226 B2 | 10/2006 | Assmann | |
| 7,178,227 B2 | 2/2007 | Ghuman et al. | |
| 7,527,222 B2 | 5/2009 | Biornstad et al. | |
| 7,559,280 B2 | 7/2009 | Kalantari | |
| 7,568,575 B2 | 8/2009 | Kalantari | |
| 7,596,843 B2 | 10/2009 | Spishak et al. | |
| 7,709,325 B2 | 5/2010 | Joseph et al. | |
| 7,735,363 B2 | 6/2010 | Mainville | |
| 7,770,292 B2 | 8/2010 | Stretton | |
| 7,779,540 B2 | 8/2010 | McCaffrey et al. | |
| 7,882,693 B2 | 2/2011 | Schilling | |
| 8,033,094 B2 | 10/2011 | Suciu et al. | |
| 8,088,450 B2 | 1/2012 | Swanberg et al. | |
| 8,104,736 B2 | 1/2012 | Callaghan | |
| 8,157,212 B2 | 4/2012 | Biornstad et al. | |
| 8,205,312 B2 | 6/2012 | Simmons | |
| 8,220,769 B2 | 7/2012 | Mainville et al. | |
| 8,229,586 B2 | 7/2012 | Wallace et al. | |
| 8,240,019 B2 | 8/2012 | Helmers | |
| 8,469,309 B2 | 6/2013 | Stuart et al. | |
| 8,590,151 B2 | 11/2013 | Brown et al. | |
| 8,672,606 B2 | 3/2014 | Glynn et al. | |
| 8,833,776 B2 | 9/2014 | Boulanger et al. | |
| 8,935,840 B2 | 1/2015 | Mitchell et al. | |
| 9,309,008 B2 | 4/2016 | Boulanger et al. | |
| 2005/0193713 A1 | 9/2005 | Kovasity et al. | |
| 2006/0107647 A1 | 5/2006 | Labala | |
| 2007/0033795 A1 * | 2/2007 | McCaffrey | B66C 11/04 |
| | | | 29/464 |
| 2009/0205768 A1 | 8/2009 | Vianello | |
| 2009/0266275 A1 | 10/2009 | Feeney | |
| 2009/0294625 A1 | 12/2009 | Fernley et al. | |
| 2010/0155566 A1 | 6/2010 | Linz | |
| 2011/0054694 A1 | 3/2011 | Munk | |
| 2011/0200245 A1 | 8/2011 | Crothers | |
| 2012/0110816 A1 | 5/2012 | Kilar et al. | |
| 2012/0159955 A1 | 6/2012 | Shiotani et al. | |
| 2012/0279064 A1 | 11/2012 | Reinhardt et al. | |
| 2014/0021292 A1 | 1/2014 | West | |
| 2014/0373353 A1 | 12/2014 | Westergaard | |
| 2015/0337798 A1 | 11/2015 | Clymans | |
| 2016/0090870 A1 | 3/2016 | Reinhardt et al. | |
| 2018/0311808 A1 | 11/2018 | Baucher et al. | |

FOREIGN PATENT DOCUMENTS

| | | |
|---|---|---|
| FR | 1467339 | 1/1967 |
| GB | 2444489 A | 6/2008 |
| LU | 85143 | 5/1984 |

OTHER PUBLICATIONS

Office Actions and responses filed in related U.S. Appl. No. 13/099,681, now U.S. Pat. No. 9,228,451.

Office Actions and responses filed in related U.S. Appl. No. 14/962,320.

Office Action received in related EP application No. 16159390.0.

* cited by examiner

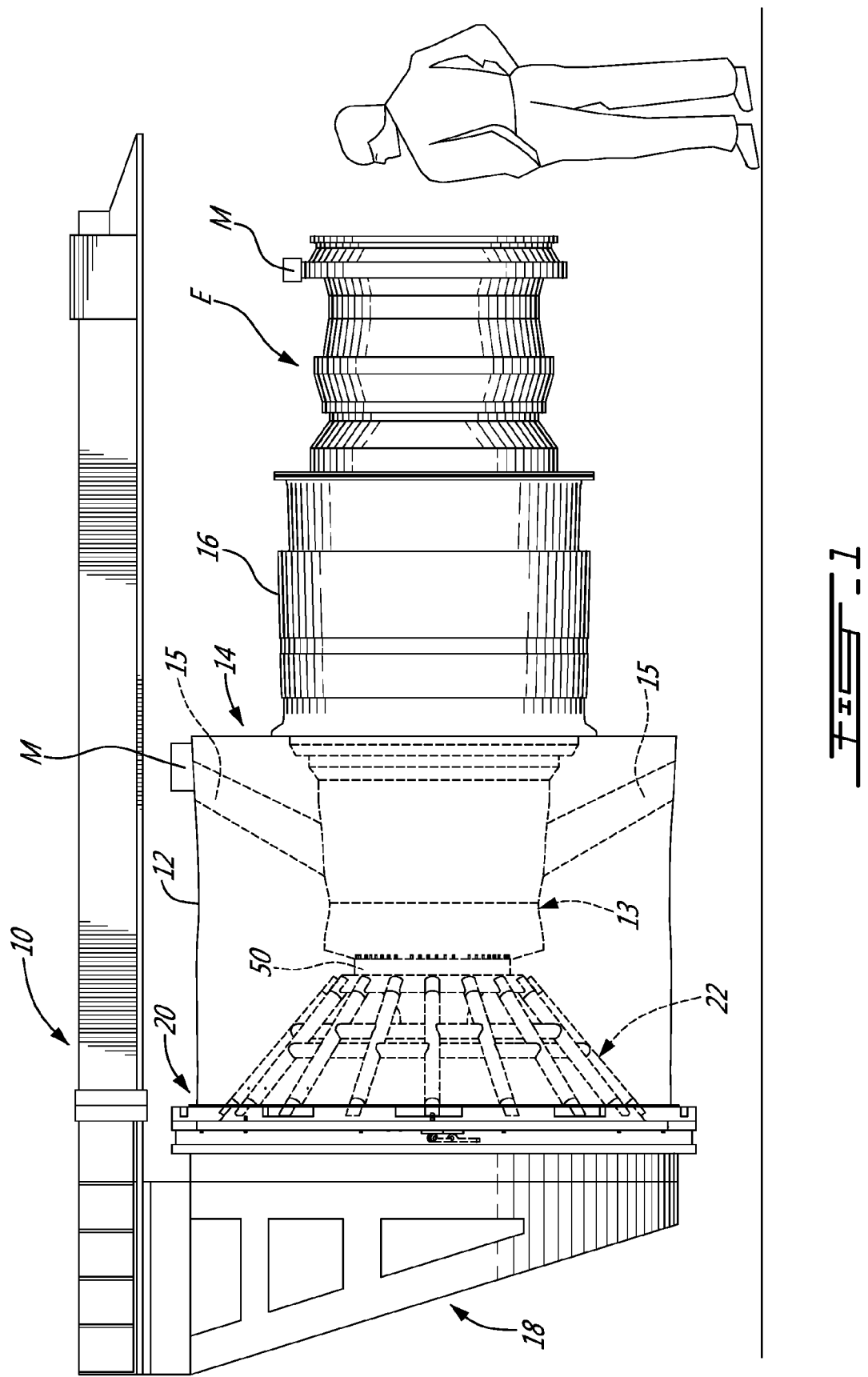

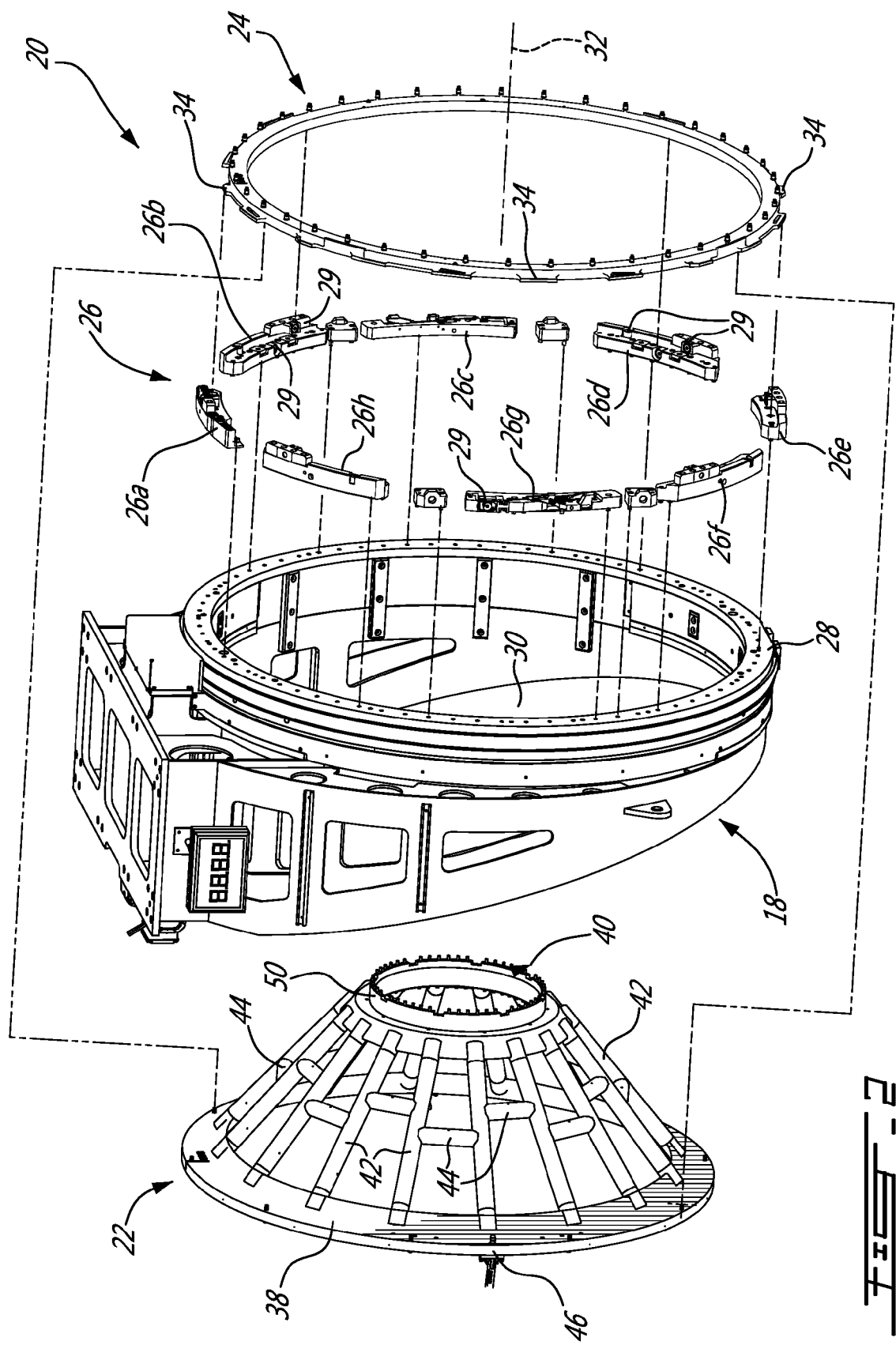

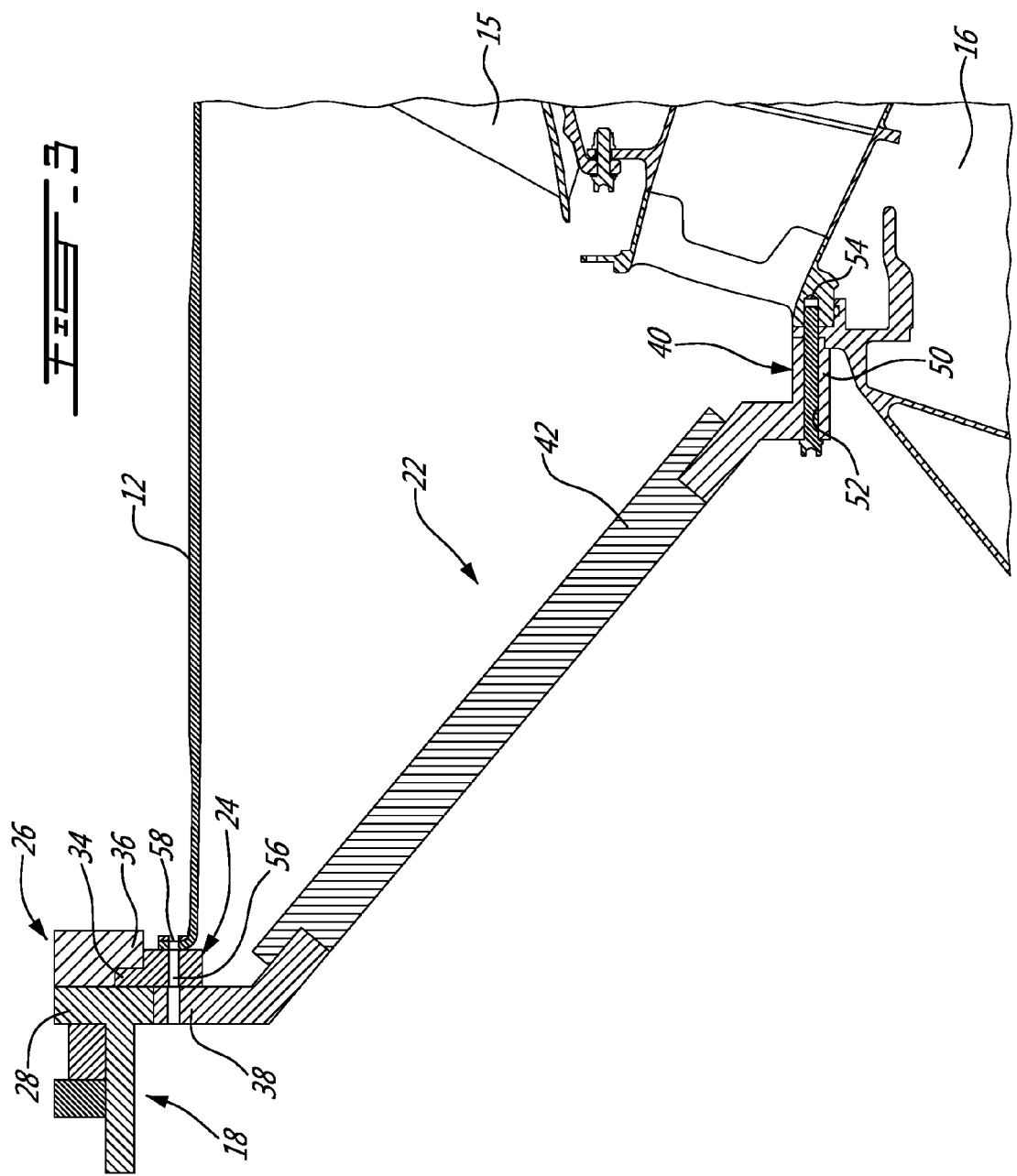

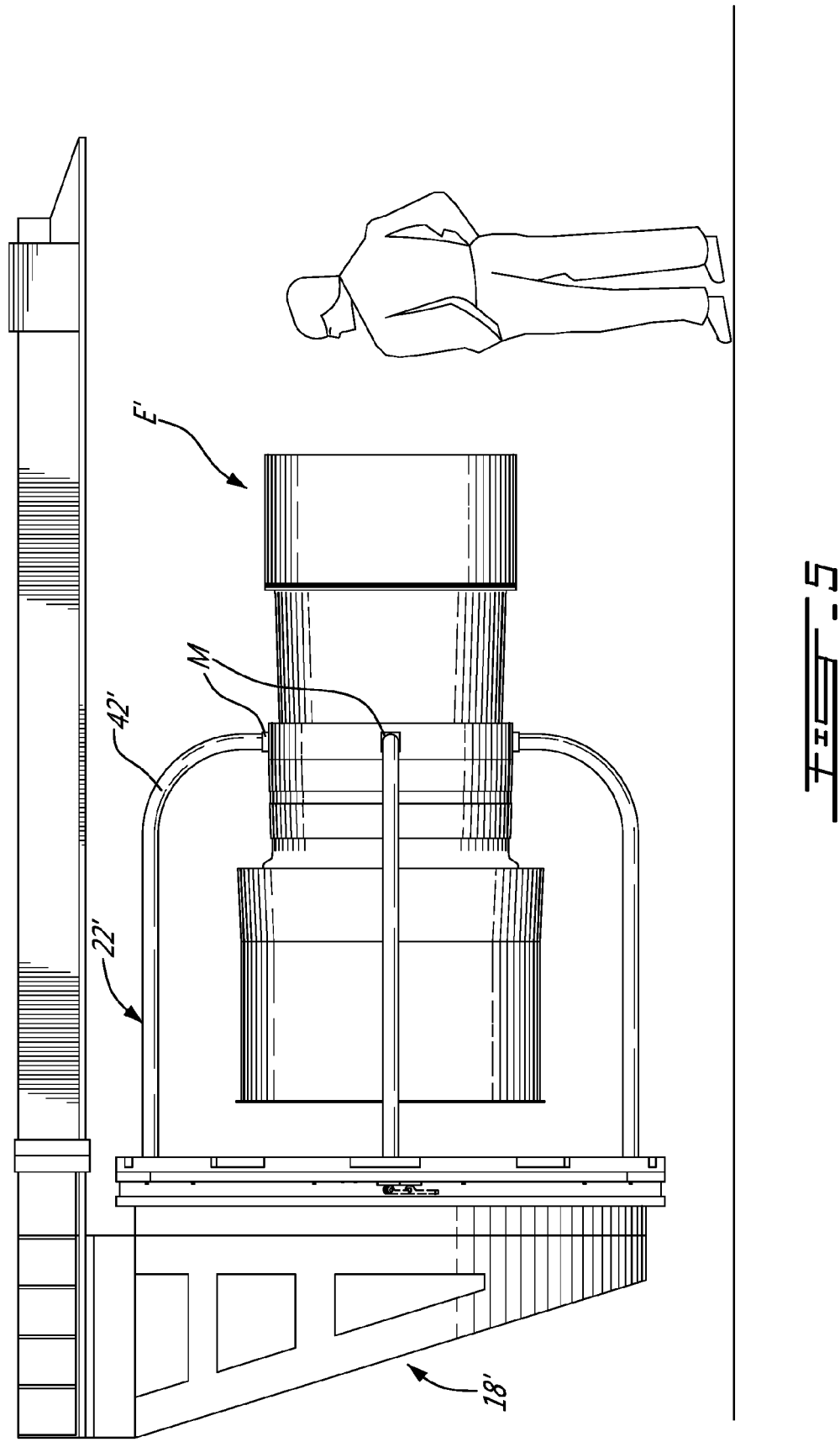

GAS TURBINE ENGINE MODULE ADAPTER TO A CARRIER

RELATED APPLICATIONS

This application is a continuation of U.S. application Ser. No. 14/962,320 filed Dec. 8, 2015, which is a divisional of U.S. patent application Ser. No. 13/099,681 filed May 3, 2011, issued as U.S. Pat. No. 9,228,451 B2 on Jan. 5, 2016, the content of which is hereby incorporated by reference.

TECHNICAL FIELD

The application relates generally to gas turbine engines and, more particularly, to a system for supporting a gas turbine engine on an overhead or a ground based carrier during assembly/disassembly or while the engine is being worked on.

BACKGROUND OF THE ART

Conventional repair and manufacturing facilities typically comprises numerous supports for holding individual sections or modules of gas turbine engines during assembly and disassembly. In this way the weight of the engine may be distributed over different points of support along the length of the engine. The supports are typically configured to externally hold the various engine sections in appropriate relative positions to permit assembly thereof. Each engine module is mounted to its dedicated support which is time consuming. Multiple jack stands need to be moved during assembly and weight of each engine module is typically supported by overhead cranes during most of the operations. The engines are typically support in a fixed position rendering access to higher or lower components difficult. The supports along the length of the engines also limit engine accessibility for the assembler/worker.

There is thus a need for a new ergonomic engine mounting arrangement to permit assembly and maintenance operations on gas turbine engines in a cost effective and time efficient manner.

SUMMARY

In one aspect, there is provided a method of assembling a gas turbine engine having a plurality of engine modules to be assembled to one another, the method comprising: mounting a first one of the engine modules to a support rotatably mounted to a carrier for rotation about a horizontal axis thereof, horizontally assembling at least one additional engine module to said first one of the engine modules by mounting said at least one additional engine module in a cantilevered fashion to said first one of the engine modules such that the assembled modules are positioned in a generally horizontal in flight position, and selectively rotating the support about the horizontal axis.

In a second aspect, there is provided a method of supporting a gas turbine engine, the method comprising: rigidly attaching a first section of a gas turbine engine to a module adaptor rotatably mounted to a carrier for rotation about a substantially horizontal axis, and using said first section of the gas turbine engine to support engine sections projecting from said first section, the first section transferring the load of the other sections to the module adaptor.

According to a third aspect, there is provided an engine mounting arrangement comprising: a module adaptor mounted to an overhead or a ground based carrier for rotation about a substantially horizontal axis, the module adaptor being rotatably mounted to the carrier for rotation about a horizontal axis, the module adaptor having at least one mounting interface configured for attachment to a module of a gas turbine engine for holding the module from which other engine modules project in a cantilever fashion as the engine is assembled.

According to a fourth aspect, there is provided a method of assembling a gas turbine engine including a plurality of engine modules to be assembled to one another, the method comprising: mounting one of the engine modules to a rotatable support, periodically rotating the support to rotate said one engine module, and horizontally assembling additional engine modules and/or external equipment to said one engine module, the additional engine modules being cantilevered from said one engine module during assembly.

According to a still further aspect, there is provided a method of supporting a gas turbine engine during assembly/disassembly or while the engine is being worked upon, the method comprising: mounting a module adaptor to a carrier for rotational movement about a substantially horizontal axis, and rigidly attaching a distal end portion of the module adaptor to an end section of the gas turbine engine having sufficient load carrying capacity to support a major portion of the weight of the engine, the end section of the engine carrying the load of other engine sections connected therewith to the module adaptor.

DESCRIPTION OF THE DRAWINGS

Reference is now made to the accompanying figures, in which:

FIG. 1 is a schematic side view of a turbofan gas turbine engine supported in a horizontal position by a module adaptor mounted to an overhead carrier;

FIG. 2 is an exploded isometric view of the module adaptor illustrating the installation procedure thereof on the overhead carrier;

FIG. 3 is an enlarged cross-sectional view illustrating the attachment of the engine to the module adaptor;

FIG. 5 is a schematic side view of a variant of the module adaptor for holding a gas turbine engine by a middle section thereof.

DETAILED DESCRIPTION OF THE PREFERRED EMBODIMENTS

Figure 4A:
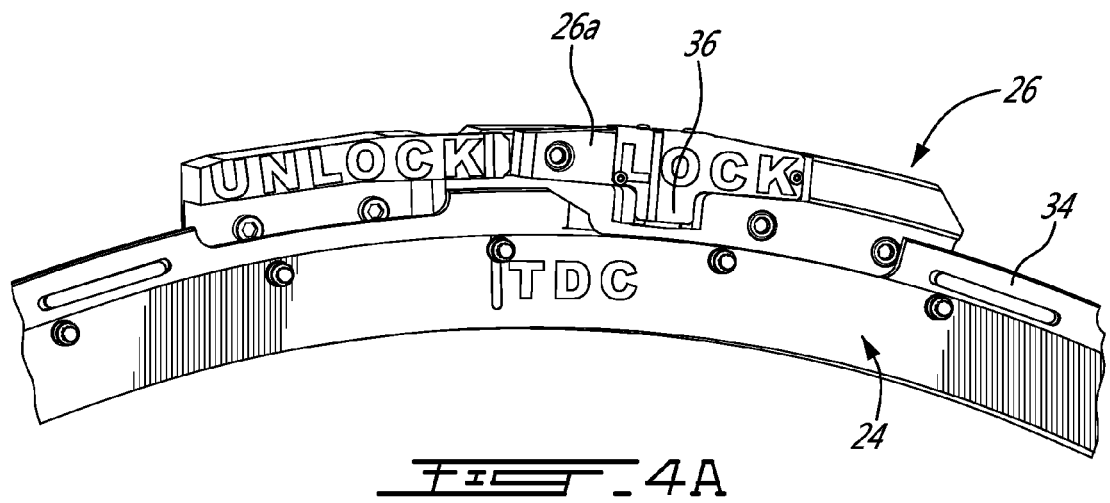
FIGS. 4a and 4b are enlarged fragmented end views illustrating the mounting of a fan mounting ring on a front face of the overhead carrier.

FIG. 1 illustrates an example of a support arrangement 10 suited for allowing a gas turbine engine E to be assembled or worked upon while being rotatably supported at one end thereof in a normal horizontal in flight position, thereby providing maximum accessibility to the workers and that all around the engine and all along the length thereof. As will be seen herein after, the support arrangement 10 may allow the engine E to be supported in a cantilever fashion with substantially all the weight of the engine E being carried by the support arrangement 10 while the engine is being assembled/disassembled or serviced. While the support arrangement 10 is illustrated as an overhead carrier system, it is understood that the support arrangement could be provided as a ground based system as well.

The support arrangement 10 illustrated in FIG. 1 is suited for providing support to large aircraft turbofan engines (20 000 lbs thrust and more) that can be assembled from front end to rear end. The exemplified engine E has a fan module 14, including a fan case 12, a fan drive assembly 13 (e.g. a gearbox) and an engine core 16 including a compressor section for compressing air entering the engine core 16, a combustor section where fuel is mixed with the compressed air and then burned to create a high energy gas stream, and a turbine section for extracting energy from the gas stream. The fan case 12 is structurally interconnected to the fan drive assembly 13 by means of struts 15 or the like. The engine core 16 may be composed of a plurality of modules adapted to be assembled together. Mounts M, such as mounting pads or the like, may be provided on the fan case 12 and on the exhaust section of the engine E or at any other suitable locations along the engine E for mounting the same to an aircraft. While in the illustrated example the support arrangement is used to support a turbofan engine, it is understood that the support arrangement 10 is adaptable to other types of gas turbine engines, such as turboprop and turboshaft engines.

The support arrangement 10 generally comprises a carrier 18 and a module adapter 20 for mounting the engine E to the carrier 18. The carrier 18 may be mounted to overhead rails or other suitable overhead structures for horizontal and vertical movements with respect thereto. As mentioned herein before, the carrier 18 could also me mounted on a ground based structure (not shown). The carrier 18 may be used to carry the engine E from one working station to the next along an assembly line. The module adapter 20 is the interface between the carrier 18 and the engine E. The module adapter 20 is removably mounted to the carrier 18 and is configured for use with a specific model of engine. Different module adapters may be used for different models of engine. As best shown in FIG. 2, the module adapter 20 may generally comprise a hollow horizontally extending support 22, a mounting ring 24 and an adapter ring 26 which may be composed of a number of circumferentially disposed segments 26a, 26b, 26c . . . 26h. The segmentation of the adapter ring 26 provides weight savings. As will be seen hereinafter, the ring 24 is adapted to be mounted to the fan case 12 of the engine E and the support 22 is adapted to be separately mounted to the fan drive assembly 13, thereby providing a dual load path mounting interface for the engine E as well as internal and external support for the engine.

The carrier 18 has a drum-like structure including a rotary adapter flange 28 and defining an open ended passage 30 having a horizontal axis 32. The rotary adapter flange 28 may be power driven by any suitable drive source for rotation about the horizontal axis 32. As can be appreciated from FIG. 2, the circumferential segments 26a, 26b . . . 26h of the adapter ring 26 are bolted or otherwise securely mounted to the front face of the rotary adapter flange 28 centrally about passage 30. The main role of the adapter ring 26 is to releasably axially retain and circumferentially lock the mounting ring 24 in position on the front face of the rotary adapter flange 28 of the carrier 18. The adapter ring 26 and the mounting ring 24 may be made of steel or from any other suitable high strength materials adapted to withstand the load of the engine E once mounted to support 22.

Figure 4B:
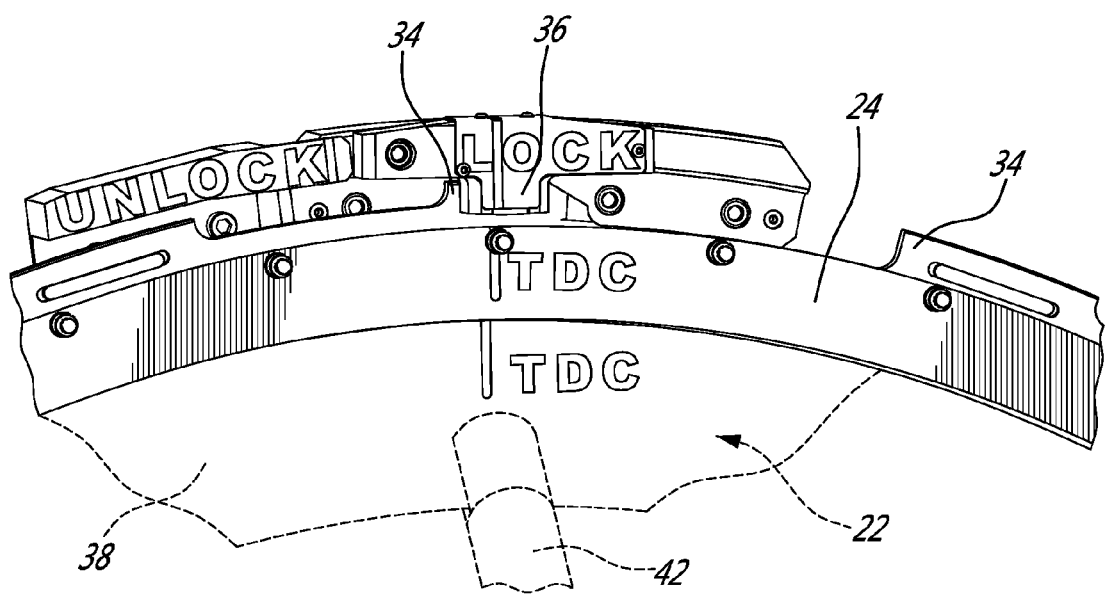

As shown in FIGS. 4a and 4b, the mounting ring 24 has an array of circumferentially spaced-apart tabs 34 projecting radially outwardly from the outer diameter thereof for engagement behind corresponding lugs or tabs 36 provided on the segments 26a, 26b . . . 26h of the adapter ring 26. The mounting ring 24 is mounted to the carrier 18 by carrying the ring 24 axially towards the front face of the rotary adapter flange 28 inside the inner diameter defined by the adapter ring 26 with the tabs 34 on the mounting ring 24 angularly offset with respect to the tabs 36 (see FIG. 4a) so that the tabs 34 clear the tabs 36 during this initial phase of the installation procedure. When the mounting ring 24 is axially abutted against a backing surface of the segments 26a, 26b . . . 26h, the rotary flange 28 is rotated as depicted by arrow 38 in FIG. 4b so as to position the tabs 36 axially over the tabs 34 of the mounting ring 24, thereby axially retaining the mounting ring 24 on the front face of the rotary flange 28 of the carrier 18. Localization aids in the form of visual indicia may be provided on the top central segment 26a and on the front facing surface of the mounting ring 24 to ensure proper positioning of the mounting ring 24 relative to the segmented adapter ring 26. Corresponding visual indicia may be provided on the support 22 for properly positioning support 22 relative to ring 26 (see top dead center (TDC) lines in FIG. 4b). As shown in FIG. 2, each segment 26a, 26b . . . 26h may carry different sets of roller bearings 29 or the like for riding on opposed axially facing surfaces of the mounting ring 24 and on the radially outer surface thereof. Skid plates (not shown) or the like may also be provided between the adapter ring 26 and the mounting ring 24 to facilitate relative rotational movement therebetween. Once the mounting ring 24 has been properly engaged with the segments of the adapter ring 26, suitable locks which may be provided, for instance, on two diametrically opposed side segments 26c and 26g of the adapter ring 26 are actuated to releasably lock the mounting ring 24 against rotational movement relative to the adapter ring 26 and, thus, relative to the rotary adapter flange 28 of the carrier 18.

From FIG. 2, it can be appreciated that the support 22 is adapted to be axially inserted through the horizontal passage 30 of carrier 18 from a rear side thereof for connection to the mounting ring 24 which is fixedly supported on the front facing side of the rotary flange 28 of the carrier 18. The support 22 has a base comprising an annular flange 38 connected to a distal truncated end portion 40 by means of an array of circumferentially spaced-apart structural members 42. The annular flange 38 and the distal end portion 40 of the support 22 may be made of steel or from other any suitable high-strength materials having sufficient load carrying capacity for supporting the engine E. The structural members 42 may be provided in the form of tubular members to provide weight savings. The structural members 42 may be made out of aluminium and the opposed ends thereof may be provided with steel fillers for allowing welding of the tubular structural members 42 to the annular flange 38 and the distal end portion 40 of the support 22. Braces 44 are provided between adjacent structural members 42 to increase the load bearing capacity of the support 22. As shown in FIG. 2, adjacent braces 44 are axially staggered around the support 22 to provide for a better distribution of the load carried by the support 22. As can be appreciated from FIG. 2, the braces 44 may be disposed on two different diameters along the support 22. The braces 44 may also be provided in the form of tubular aluminium members. The braces 44 may be welded or otherwise suitably connected to structural members 42.

A pair of localization pins 46 may be provided at diametrically opposed locations on the annular flange 38 of the base of the support 22 for engagement with corresponding holes in the mounting ring 24. The localization pins 46 allow to appropriately position the cone-shaped support 22 relative to the mounting ring 24 (and thus the fan case 12) before the annular flange 38 of the support 22 be bolted or otherwise suitably detachably mounted to the mounting ring 24. The support 22 is attached to the mounting ring 24 only after the mounting ring 24 has been locked in position on the front end of the drum 28 by the segmented adapter ring 26, as per the way described herein above.

As shown in FIG. 1, after having been rigidly attached to the mounting ring 24, the support 22 projects axially forwardly from the passage 30 of the carrier 18. The support 22 is configured to axially project into the fan case 12 of the engine E for allowing the connection of the support 22 to the front of the fan drive assembly 13. The conical shape of the support 22 allows to gradually transition from a large diameter at the base of the support 22 to a smaller diameter suitable for connection to the fan drive assembly 13 while preserving maximum accessibility for the workers to access the interior of the engine E from within the support 22. It is understood that other suitable shapes are contemplated as well. The distal end portion 40 provides a first mounting interface for attaching the engine E to the support 22. As shown in FIG. 3, the distal end portion 40 of the support 22 may merge into an axially extending mounting collar 50 configured for mating engagement with a corresponding rigid and sturdy structure at the front end of the drive fan assembly 13. In the illustrated example, the collar 50 may have an inner surface adapted to fit over an outside diameter surface at the front end of the fan drive assembly 13. The inner diameter surface of the collar 50 thus provides a reference surface for the mounting of the engine E to the support 22. A circumferential array of holes 52 are defined in the collar 50. The holes 52 are adapted to be placed in registry with a corresponding existing set of holes 54 defined in the front end of the fan drive assembly 13, thereby allowing bolting of the fan drive assembly 13 to the support 22. Other suitable internal attachment arrangements are contemplated as well. For instance, the distal end of the support 22 could be attached to other internal engine structures having sufficient structural integrity to support the weight of the engine during the majority of the assembly process. For instance, the support could be attached to an existing mounting structure at the front end of the engine core 16.

According to one example, the support 22 and the engine part attached thereto must be able to support the equivalent of a cantilever load of 6500 lb (2948 kg) applied at 62 inches (1.57 m) from the attachment interface (i.e. the flange 38) of the cone-shaped support 22 to the mounting ring 24. The conical shape of the support 22 allows to efficiently transferring the engine load from a small diameter to a larger diameter at the base of the support 22. The support 22 acts as a temporary reinforcing member between the fan case 12 and the fan drive assembly 13 to provide the additional structural integrity required for holding the engine in a cantilever fashion.

As shown in FIG. 3, the mounting ring 24 provides a second mounting interface for connecting the engine E to the module adapter 20. A set of circumferentially spaced-apart holes 56 in the mounting ring 24 is aligned with a corresponding set of holes 58 in the fan case 12 and bolts (not shown) are provided for rigidly mounting the fan case 12 to the mounting ring 24. The second mounting interface is concentric to the above described first mounting interface of the module adapter 20 and cooperates therewith to ensure concentricity between the fan case 14, the fan drive assembly 13 and the engine core 16 all along the engine assembly process. Once the assembly of the engine E has been completed, the engine may be detached from the support cone 22 and the mounting ring 24 may remain attach to the fan case 12 of the fan section 14 of the engine E to permit mounting of other equipment, such as testing equipment and the like.

One possible engine build process will now be described. The mounting ring 24 is first installed on the fan case 12. The ring and the fan case assembly are then attached to the carrier 18 by the engagement of the locking tabs 34 and 36 of the ring 24 and the segments 26a, 2b . . . 26h on the front face of the rotary flange 28 of the carrier 18. The support 22 is then inserted through the passage 30 of the carrier 18 and the annular mounting flange 38 of the support 22 is bolted to the rear face of the mounting ring 24. The fan drive assembly 13 is then installed on the support 22 by bolting the distal end portion 40 of the support 22 to an existing mounting flange at the front end of the drive fan assembly 13. The various modules of the engine core 16 are added thereafter with the engine E being supported both by support 22 and mounting ring 24. After the front end section of the engine E has been so attached to the module adapter 20 as described above, the rotary flange 28 of the carrier 18 may be rotated in clockwise or counter clockwise directions about axis 32 so that the underside of the engine E may be exposed and a worker may access the underside of the engine E without the need to otherwise crawl underneath the engine. The worker can also easily access the interior of the fan case 12 via the rear side of the carrier 18. The open framework of the hollow cone-shaped support 22 allows the worker to have access to the interior of the fan case 12 from within the support 22 itself. Near the end of the assembly process, a rear support (not shown) may be provided to provide support at the rear end of the engine E. The internal support 22 may then be removed and the fan rotor may be positioned in the fan case 12 for connection to the fan drive assembly 13 to complete the engine.

The above engine mounting arrangement allows an engine to be built from a first end to a second end thereof (from front to rear or vice versa) while the engine is supported in a cantilevered fashion. In the case of a turbofan engine, the support 22 can be fitted inside the fan case 12 and then bolted to the mounting ring 24 with the front end of the fan drive assembly 13 bolted to the distal end 40 of the support 22. The engine fan drive assembly 13 carry the load to the support 22. Another portion of the load is carried by the mounting ring 24 via the fan case and the struts 15 between the fan case 12 and the fan drive assembly 13. Depending one the weight of the engine, only one mounting interface may be sufficient.

FIG. 5 illustrates alternatives to some of the features described above with reference to FIGS. 1 to 4. As mentioned above the module adaptor is designed to meet the requirements of the engine is it designed to support. For instance, for small engines only one mounting interface may be sufficient. Indeed, if the module adaptor may be connected to an engine part which is strong enough to support the entire engine, then one mounting interface may be sufficient (i.e. no need for a secondary load path). The module adaptor illustrated in FIG. 5 is suitable for horizontally supporting smaller gas turbine engines (10 000 lbs of thrust or less). The module adaptor may only comprise a support 22' provided in the form of a cage structure having an open framework projecting horizontally from the carrier 18' for rotation about a horizontal axis. The support 22' has a mounting flange, which may be similar to flange 38, and which may be directly bolted to the rotary flange of the carrier 18'. A plurality of circumferentially spaced-apart arms or structural members 42' extend from the mounting flange. The structural members 42' are disposed to circumscribe an internal volume sufficient to accommodate the engine in order to support the same from the exterior. The number of structural member 42' may be less than the number of arms 42 (FIGS. 1 to 4) to facilitate access to the engine part held inside the external support 22'. At the distal ends of the support members 42, there is provided a mounting interface for connection to existing mounting features of the engine E'. As can be appreciated from FIG. 5, the engine E' is still supported from one end thereof but the support 22' is attached to the engine at a location more towards the middle of the engine. In the illustrated example, the support 22' is connected to mounting pads M' typically used for mounting the engine E' to the aircraft.

As can be appreciated from the foregoing, the module adapter 20 facilitates the assembly and handling of gas turbine engines while at the same time strengthening the engines during assembly. The module adapter 20 allows performing necessary maintenance, assembly and the like, in a cost effective and time efficient manner. The engine may be supported in a horizontal position at a proper elevation from the floor for allowing the worker to comfortably perform the required maintenance or assembly/disassembly procedures without having to bend or stretch to reach the various parts of the engine.

The above description is meant to be exemplary only, and one skilled in the art will recognize that changes may be made to the embodiments described without departing from the scope of the invention disclosed. For instance, the adapter ring 26 could be modified. The segments could be replaced by a full ring. Also the adapter ring 26 could be replaced by another retaining arrangement for fixedly holding the mounting ring 24 on the carrier 18. The support 22 could be mounted directly to the carrier 18. Also the drum structure of the carrier 18 could be stationary and the support 22 could be rotatably mounted thereto. Still other modifications which fall within the scope of the present invention will be apparent to those skilled in the art, in light of a review of this disclosure, and such modifications are intended to fall within the appended claims.

What is claimed is:

1. A method of assembling a gas turbine engine having a plurality of engine modules to be assembled to one another, the method comprising: rotatably mounting a first one of the engine modules to a carrier of an overhead assembly line, horizontally assembling at least one additional engine module to said first one of the engine modules by mounting said at least one additional engine module in a cantilevered fashion to said first one of the engine modules such that the assembled modules are positioned along a horizontal axis, selectively rotating the assembled modules about the horizontal axis, and displacing the assembled modules along the overhead assembly line with the carrier.

2. The method defined in claim 1, wherein the first one of the engine modules is a fore or aft end module, and wherein at least a second additional engine module is mounted to the first one and the at least one additional module in a cantilevered fashion.

3. The method defined in claim 1, wherein rotatably mounting a first one of the engine modules to the carrier comprises mounting a fan module of the engine to the carrier, the fan module having a fan case.

4. The method defined in 1, wherein the first one of the engine modules is cantilevered mounted from the carrier.

5. The method defined in claim 1, wherein the first one of the engine modules is centrally-mounted to a support rotatably mounted to the carrier.

6. The method defined in claim 1, wherein the first one of the engine modules is an end module, wherein the engine is built from said one end module to an opposed end of the engine, and wherein the at least one additional module comprises a plurality of modules mounted in a cantilevered fashion relative to the end module.

7. The method defined in claim 1, wherein the first one of the engine modules is mounted to the carrier from an outside portion of the module.

8. The method defined in claim 1, wherein the additional engine modules project fore and aft of said first one of the engine modules while mounted to the carrier.

9. The method defined in 1, wherein the first one of the engine modules is cantilevered mounted from the carrier.

10. The method defined in claim 9, wherein the first one of the engine modules is an end module, wherein the engine is built from said one end module to an opposed end of the engine, and wherein the at least one additional module comprises a plurality of modules mounted in a cantilevered fashion relative to the end module.

11. The method defined in claim 10, wherein the first one of the engine modules is mounted to the carrier from an outside portion of the module.

12. The method defined in claim 11, wherein the additional engine modules project fore and aft of said first one of the engine modules while mounted to the carrier.

13. The method defined in claim 1, wherein the first one of the engine modules is centrally-mounted to a support rotatably mounted to the carrier.

14. The method defined in claim 13, wherein the first one of the engine modules is an end module, wherein the engine is built from said one end module to an opposed end of the engine, and wherein the at least one additional module comprises a plurality of modules mounted in a cantilevered fashion relative to the end module.

15. The method defined in claim 13, wherein the first one of the engine modules is mounted to the support from an outside portion of the module.

16. The method defined in claim 15, wherein the additional engine modules project fore and aft of said first one of the engine modules while mounted to the support.

17. A method of assembling a gas turbine engine having a plurality of engine modules to be assembled to one another, the method comprising: rotatably mounting a first one of the engine modules to a carrier of an overhead assembly line, horizontally assembling at least one additional engine module to said first one of the engine modules by mounting said at least one additional engine module in a cantilevered fashion to said first one of the engine modules such that the assembled modules are positioned along a horizontal axis in a generally horizontal in flight position, selectively rotating the assembled modules about the horizontal axis, and rotatably supporting a distal end of the assembled engine after at least one additional engine module has been mounted to the first one of the engine modules.

18. The method defined in claim 17, wherein the first one of the engine modules is a fore or aft end module.

19. The method defined in claim 17, wherein mounting the first one of the engine modules to the carrier comprises mounting a fan module of the engine to the carrier, the fan module having a fan case.

20. The method defined in 17, wherein the first one of the engine modules is cantilevered mounted from the carrier.

21. The method defined in claim 17, wherein the first one of the engine modules is centrally-mounted to the carrier.

22. The method defined in claim 17, wherein the first one of the engine modules is an end module, wherein the engine is built from said one end module to an opposed end of the engine, and wherein the at least one additional module comprises a plurality of modules mounted in a cantilevered fashion relative to the end module.

23. The method defined in claim 17, wherein the first one of the engine modules is mounted to the carrier from an outside portion of the module.

24. The method defined in claim 17, wherein the additional engine modules project fore and aft of said first one of the engine modules while mounted to the carrier.

25. The method defined in 19, wherein the first one of the engine modules is cantilevered mounted from the carrier.

26. The method defined in claim 19, wherein the first one of the engine modules is centrally-mounted to the carrier.

27. The method defined in claim 26, wherein the first one of the engine modules is an end module, wherein the engine is built from said one end module to an opposed end of the engine, and wherein the at least one additional module comprises a plurality of modules mounted in a cantilevered fashion relative to the end module.

28. The method defined in claim 27, wherein the first one of the engine modules is mounted to the carrier from an outside portion of the module.

29. The method defined in claim 25, wherein the first one of the engine modules is an end module, wherein the engine is built from said one end module to an opposed end of the engine, and wherein the at least one additional module comprises a plurality of modules mounted in a cantilevered fashion relative to the end module.

30. The method defined in claim 29, wherein the first one of the engine modules is mounted to the carrier from an outside portion of the module.

31. A method of assembling a gas turbine engine having a plurality of engine modules to be assembled to one another, the method comprising: rotatably mounting a first one of the engine modules to a carrier of an overhead assembly line, horizontally assembling at least one additional engine module to said first one of the engine modules by mounting said at least one additional engine module in a cantilevered fashion to said first one of the engine modules such that the assembled modules are positioned along a horizontal axis in a generally horizontal in flight position, selectively rotating the engine about the horizontal axis prior to or after the at least one additional engine module has been mounted to the first one of the engine modules.

32. The method defined in claim 31, wherein the first one of the engine modules is a fore or aft end module, and wherein at least a second additional engine module is mounted to the first one and the at least one additional module in a cantilever fashion.

33. The method defined in claim 31, wherein mounting the first one of the engine modules to the carrier comprises mounting a fan module of the engine to the carrier, the fan module having a fan case.

34. The method defined in 33, wherein the first one of the engine modules is cantilevered mounted from the carrier.

35. The method defined in claim 34, wherein the first one of the engine modules is an end module, wherein the engine is built from said one end module to an opposed end of the engine, and wherein the at least one additional module comprises a plurality of modules mounted in a cantilevered fashion relative to the end module.

36. The method defined in claim 35, wherein the first one of the engine modules is mounted to the carrier from an outside portion of the module.

37. The method defined in claim 33, wherein the first one of the engine modules is centrally-mounted to the carrier.

38. The method defined in claim 37, wherein the first one of the engine modules is an end module, wherein the engine is built from said one end module to an opposed end of the engine, and wherein the at least one additional module comprises a plurality of modules mounted in a cantilevered fashion relative to the end module.

39. The method defined in claim 38, wherein the first one of the engine modules is mounted to the carrier from an outside portion of the module.

40. The method defined in 31, wherein the first one of the engine modules is cantilevered mounted from the carrier.

41. The method defined in claim 31, wherein the first one of the engine modules is centrally-mounted to the carrier.

42. The method defined in claim 31, wherein the first one of the engine modules is an end module, wherein the engine is built from said one end module to an opposed end of the engine, and wherein the at least one additional module comprises a plurality of modules mounted in a cantilevered fashion relative to the end module.

43. The method defined in claim 31, wherein the first one of the engine modules is mounted to the carrier from an outside portion of the module.

44. The method defined in claim 31, wherein the additional engine modules project fore and aft of said first one of the engine modules while mounted to the carrier.

45. A method of assembling a gas turbine engine having a plurality of engine modules to be assembled to one another, the method comprising: rotatably mounting a first one of the engine modules to a carrier displaceable along an overhead assembly line, horizontally assembling at least one additional engine module to said first one of the engine modules by mounting said at least one additional engine module in a cantilevered fashion to said first one of the engine modules such that the assembled modules are positioned along a horizontal axis in a generally horizontal in flight position, selectively rotating the engine about the horizontal axis, and mounting external equipment to the engine after selectively rotating the engine.

46. The method defined in claim 45, wherein the first one of the engine modules is a fore or aft end module, and wherein at least a second additional engine module is mounted to the first one and the at least one additional module in a cantilever fashion.

47. The method defined in claim 45, wherein mounting the first one of the engine modules to the carrier comprises mounting a fan module of the engine to the carrier, the fan module having a fan case.

48. The method defined in claim 47, wherein the first one of the engine modules is cantilevered mounted from the carrier.

49. The method defined in claim 48, wherein the first one of the engine modules is an end module, wherein the engine is built from said one end module to an opposed end of the engine, and wherein the at least one additional module comprises a plurality of modules mounted in a cantilevered fashion relative to the end module.

50. The method defined in claim 49, wherein the first one of the engine modules is mounted to the carrier from an outside portion of the module.

51. The method defined in claim 47, wherein the first one of the engine modules is centrally-mounted to the carrier.

52. The method defined in claim 51, wherein the first one of the engine modules is an end module, wherein the engine is built from said one end module to an opposed end of the engine, and wherein the at least one additional module comprises a plurality of modules mounted in a cantilevered fashion relative to the end module.

53. The method defined in claim 52, wherein the first one of the engine modules is mounted to the carrier from an outside portion of the module.

54. The method defined in 45, wherein the first one of the engine modules is cantilevered mounted from the carrier.

55. The method defined in claim 45, wherein the first one of the engine modules is centrally-mounted to the carrier.

56. The method defined in claim 45, wherein the first one of the engine modules is an end module, wherein the engine is built from said one end module to an opposed end of the engine, and wherein the at least one additional module comprises a plurality of modules mounted in a cantilevered fashion relative to the end module.

57. The method defined in claim 45, wherein the first one of the engine modules is mounted to the carrier from an outside portion of the module.

58. The method defined in claim 45, wherein the additional engine modules project fore and aft of said first one of the engine modules while mounted to the carrier.

59. The method defined in claim 45 further comprising displacing the carrier along the overhead assembly line after at least the first one of the engine modules has been mounted to the carrier.

* * * * *